Patented Dec. 9, 1941

2,265,902

UNITED STATES PATENT OFFICE 2,265,902

PROCESS FOR TREATING POOR MANGANESE ORES CONTAINING PHOSPHORUS

Hans Hahl, Volklingen, Saar, Germany, assignor, by mesne assignments, to Percy H. Royster, Montclair, N. J.

No Drawing. Application May 7, 1938, Serial No. 206,607. In Germany May 12, 1937

3 Claims. (Cl. 75—131)

It is known that ferromanganese and other manganese alloys with a high percentage of manganese can only be obtained from manganese ores which are poor in phosphorus and besides manganese do not contain more than a certain quantity of iron. For the production of ferromanganese, only high grade manganese ores can therefore be used. As, however, such ores are only to be found in a few districts throughout the world, it is important that it should be possible to produce ferromanganese from manganese ores which are poor in iron and rich in phosphorus.

A way for solving this problem will be hereinafter described. According to the invention the ores are first smelted in a blast furnace with a more or less strongly acid slag yield. Thus a more or less strongly acid slag yield. Thus a more or less strongly silicized crude iron is produced which contains the whole phosphorus of the charge but only little manganese. The greater portion of the sulphur passes into the slag during the smelting owing to the high manganese content of the charge. The ratio of distribution depends upon the lime- and manganese content of the slag. If the blasted crude iron contains too much sulphur this is removed in known manner by desulphurizing agents, for instance by solid or previously melted soda or by substances containing soda.

The acid slag produced during the smelting of the ore contains almost the whole of the manganese contained in the charge but practically no phosphorus and thus constitutes a raw material which is very suitable for producing ferromanganese. The slag is again worked in a blast furnace with an addition of sufficient quantities of lime or limestone. At the same time by yield of a highly basic slag and by employing sufficient quantities of fuel and air of high temperature the greatest part of the manganese is reduced. A highly basic slag poor in manganese and a ferromanganese poor in phosphorus are formed. For the reduction of the manganese an electric furnace can also be used with advantage.

The following example illustrates the process:

In the case of acid smelting 1000 kilogrammes of Fernie—ore in dry state, that is a low grade German manganese ore containing in dry state 24% of iron, 19% of manganese and 20 to 25% of silica, and commonly containing 20% of humidity, 1000 kilogrammes of Siegerland sparry iron ore and 200 kilogrammes of burnt lime are charged. The coke addition amounts to 850 kilogrammes. The resultant slag contains:

| | Per cent |
|---|---|
| SiO₂ | 30 |
| MnO=21% Mn | 27 |
| Al₂O₃ | 21 |
| CaO | 17 |
| FeO | 2 |

The crude iron contains:

| | Per cent |
|---|---|
| Si | 2.5 |
| Mn | 0.4 |
| C | 3.0 |
| P | 0.7 |
| S | 0.015–0.15 |

The acid slag is then smelted in a blast furnace with addition of the necessary quantity of raw materials containing iron and poor in phosphorus, preferably such which themselves contain manganese. For the sake of simplicity it is here assumed, that calcined pyrites is added. The mixture for 50% ferromanganese then consists of

| | Kgs. |
|---|---|
| Slag from the preceding smelting with acid slag yield | 1000 |
| Burnt lime | 300 |
| Calcined pyrites | 230 |

The slag produced during the smelting with basic slag yield contains:

| | Per cent |
|---|---|
| SiO₂ | 26 |
| CaO | 43 |
| Al₂O₃ | 11 |
| Mn=round 8% MnO | 6 |

The yield of ferromanganese amounts to 280 kgs., the quantity of slag to 1400 kgs., so that the proportion of metal to slag is 1:5. Nevertheless a yield in manganese of 63% is attained. The total consumption of coke for carrying out the process is about 120% related to the yield of crude iron and ferromanganese.

It has already been proposed, for the production of ferromanganese from poor manganese ores to melt these ores with additions under a neutral or weakly acid slag in a drum or rotary furnace, to treat the molten slag at a low temperature with charcoal or some other reducing agent so that the excess of iron, but not the manganese, is reduced, and finally to smelt the slag rich in manganese but poor in iron in the usual manner in a blast furnace. This process is unsuitable for the treatment of manganese ore containing phosphorus as the phosphoric acid will not be reduced during the treatment of the molten slag in a drum or rotary furnace and consequently will not combine with the reduced iron. Contrary to this process carried out at low temperature, according to the invention the simultaneous reduction of manganese is prevented in the first stage by the addition of a strongly acid slag, a blast furnace being used and an almost complete reduction of the phosphorus which was present in the crude ore being attained. The process according to the invention is not only more economical than the known process but is also applicable for impure manganese ores.

I claim:

1. A process for treating poor manganese ore containing phosphorus, consisting in first smelting the ore in a blast furnace with acid burdening to a phosphorus pig iron poor in manganese, and then charging the resultant slag rich in manganese and poor in phosphorus with addition of lime and iron containing materials into a blast furnace with basic burdening to produce ferromanganese poor in phosphorus.

2. A process for treating poor manganese ore containing phosphorus, consisting in first smelting the ore in a blast furnace with acid burdening to a phosphorus pig iron poor in manganese and then charging the resultant slag rich in manganese and poor in phosphorus with addition of a calcium base fluxing agent into a blast furnace with basic burdening to produce ferromanganese poor in phosphorus.

3. A process for treating poor manganese ore containing phosphorus, consisting in first smelting the ore in a blast furnace with acid burdening to a phosphorus pig iron poor in manganese, the charge in the first step being so proportioned that the ratio of $SiO_2$ to $CaO$ is not less than 1.75, and then charging the resultant slag rich in manganese and poor in phosphorus with addition of a calcium base fluxing agent into a blast furnace with basic burdening to produce ferromanganese poor in phosphorus.

HANS HAHL.